(12) United States Patent
Ueda et al.

(10) Patent No.: US 8,561,111 B2
(45) Date of Patent: Oct. 15, 2013

(54) VIDEO PROCESSOR, TELEVISION DISPLAY DEVICE, AND VIDEO PROCESSING METHOD

(75) Inventors: Yutaka Ueda, Tokyo (JP); Shouichi Yokobori, Saitama (JP); Hideo Kataoka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/478,796

(22) Filed: May 23, 2012

(65) Prior Publication Data

US 2013/0055334 A1    Feb. 28, 2013

(30) Foreign Application Priority Data

Aug. 31, 2011   (JP) .................................. 2011-189950

(51) Int. Cl.
*H04N 5/445* (2011.01)

(52) U.S. Cl.
USPC .................................. 725/52; 725/43; 725/44

(58) Field of Classification Search
USPC .......................................... 725/44, 52, 41, 43
See application file for complete search history.

(56) References Cited

U.S. PATENT DOCUMENTS

| | | | |
|---|---|---|---|
| 2006/0195521 A1* | 8/2006 | New et al. ...................... 709/204 |
| 2008/0092168 A1* | 4/2008 | Logan et al. ..................... 725/44 |
| 2009/0116817 A1* | 5/2009 | Kim et al. ......................... 386/95 |
| 2011/0010395 A1 | 1/2011 | Murakoshi | |

FOREIGN PATENT DOCUMENTS

| | | |
|---|---|---|
| JP | 2002007739 | 1/2002 |
| JP | 2009-077322 | 4/2009 |
| JP | 2009077322 | 4/2009 |
| JP | 2011019172 | 1/2011 |

OTHER PUBLICATIONS

Japanese Patent Application No. 2011-189950, Notice of Rejection, mailed Jul. 24, 2012, (with English Translation).
Japanese Patent Application No. 2011-189950, Notice of Rejection, mailed Oct. 9, 2012, (with English Translation).

* cited by examiner

*Primary Examiner* — Chris Parry
*Assistant Examiner* — Sumaiya A Chowdhury
(74) *Attorney, Agent, or Firm* — Blakely, Sokoloff, Taylor & Zafman LLP

(57) ABSTRACT

According to one embodiment, a video processor includes: a list output module; a selection receiver; and a data controller. The list output module is configured to output screen information in which a plurality of pieces of list information are arranged. Each of the pieces of list information includes pieces of identification information each identifying a scene contained in video data and arranged in an order in which scenes are played. The selection receiver is configured to receive a selection of one of the pieces of identification information comprised in one of the pieces of list information. The data controller is configured to control playing the video data from a scene identified by the one of identification information received by the selection receiver.

8 Claims, 10 Drawing Sheets

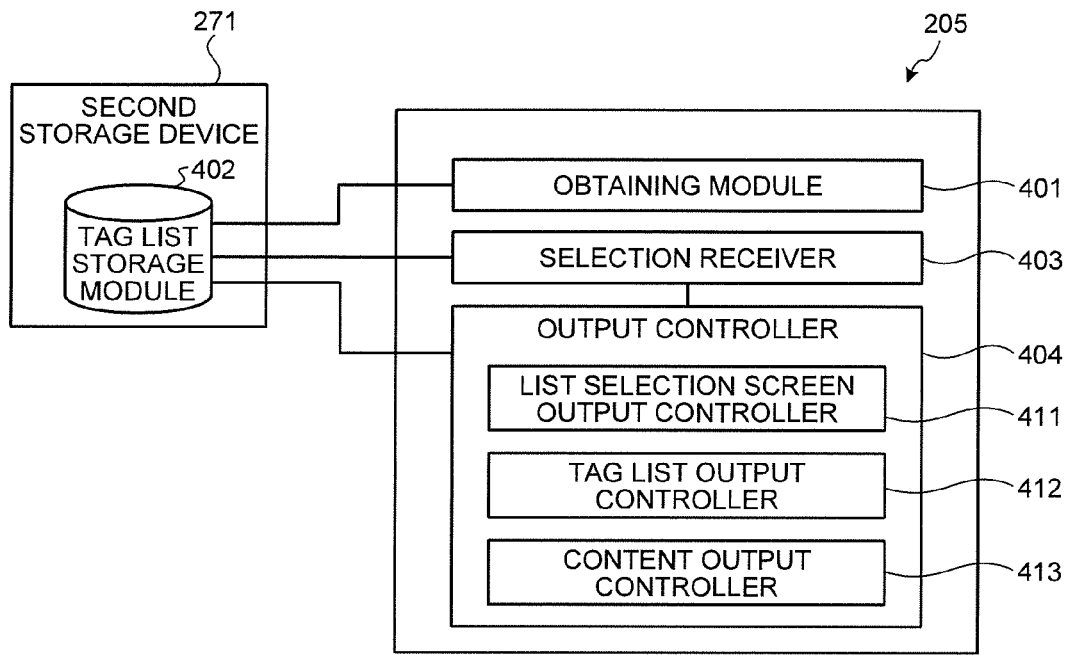

FIG.6

| TAG POSITION (TIME H:MM:SS) | TAG |
|---|---|
| 0:15:10 | TEAM B YELLOW CARD |
| 0:29:01 | TEAM B SHOOT! |
| 0:76:40 | TEAM B PLAYER SUBSTITUTION |

FIG.7

| TAG POSITION (TIME H:MM:SS) | TAG |
|---|---|
| 0:20:32 | TEAM A PLAYER SUBSTITUTION |
| 0:40:10 | TEAM A GOAL!! |
| 0:60:01 | TEAM A SHOOT! |
| 0:81:40 | TEAM A PLAYER SUBSTITUTION |

FIG.8

| TAG POSITION (TIME H:MM:SS) | TAG |
|---|---|
| 0:10:17 | PLAYER X DRIBBLED THROUGH DEFENSE! |
| 0:50:10 | PLAYER X MAKING OVERHEAD SHOOT! |

FIG.9

```
<taglisttitle>DIGEST: CREATED BY USER 1</taglisttitle>          911
<programname>WORLD CUP JAPAN VS. US</programname>               901
<rec-date>20220629</rec-date>                                    902
<start>2054</start>                                              903
<station>BS181</station>                                         904
<ch-code>D000-181</ch-code>
<taglist>                                                        905
   <tagging-01>                                                  912
      <timestamp>00:15:10</timestamp>                            913
      <text>TEAM B YELLOW CARD</text>                            914
   </tagging-01>
   <tagging-02>
      <timestamp>00:15:10</timestamp>
      <text>TEAM B SHOOT!</text>
   </tagging-02>
   <tagging-03>
      <timestamp>00:15:10</timestamp>
      <text>TEAM B PLAYER SUBSTITUTION</text>
   </tagging-03>
</taglist>
```

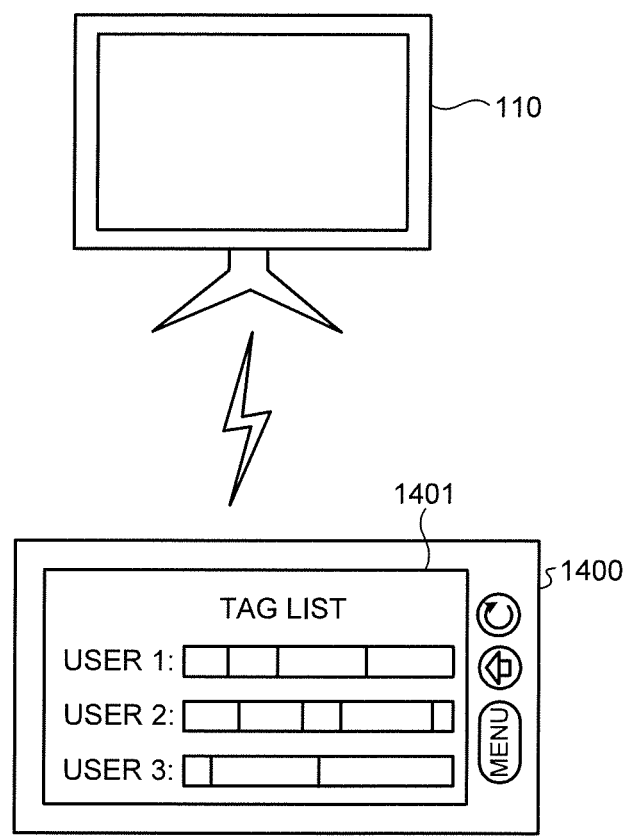

VIDEO PROCESSOR, TELEVISION DISPLAY DEVICE, AND VIDEO PROCESSING METHOD

CROSS-REFERENCE TO RELATED APPLICATIONS

This application is based upon and claims the benefit of priority from Japanese Patent Application No. 2011-189950, filed on Aug. 31, 2011, the entire contents of which are incorporated herein by reference.

FIELD

Embodiments described herein relate generally to a video processor, a television display device, and a video processing method.

BACKGROUND

Conventionally, there is proposed a technology for inserting identification information (a tag or a chapter) identifying a scene desired by a user into a broadcasted program content, a program content distributed over a network, or a video content created by the user. Such identification information allows the user to recognize each scene of the content.

Also, conventionally technology proposes managing a tag list and the like on a server over the network. In this manner, a user can create a tag list and allow another user to obtain the list from the server, and to use the tag list when viewing the content.

A tag list or a chapter list is created to facilitate a user to easily understand the content. However, there has been an assumption that only a single tag list or chapter list is used to facilitate user's recognition of the content. Therefore, conventionally, displaying a plurality of tag lists or chapter lists has not been considered. However, a plurality of tag lists or chapter lists may be created from different perspectives.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 4 is an exemplary diagram of a software configuration realized by a controller in the content recorder in the first embodiment;

FIG. 5 is an exemplary diagram of a content selection screen in the first embodiment;

FIG. 6 is an exemplary diagram of a tag list created by a user 1, in the first embodiment;

FIG. 7 is an exemplary diagram of a tag list created by a user 2, in the first embodiment;

FIG. 8 is an exemplary diagram of a tag list created by a user 3, in the first embodiment;

FIG. 9 is an exemplary diagram of a format of a tag list transmitted from a tag management server to another device in the first embodiment;

FIG. 14 is an exemplary diagram of a mobile terminal device and a television display device according to a third embodiment.

DETAILED DESCRIPTION

In general, according to one embodiment, a video processor comprises: a list output module; a selection receiver; and a data controller. The list output module is configured to output screen information in which a plurality of pieces of list information are arranged. Each of the pieces of list information comprises pieces of identification information each identifying a scene contained in video data and arranged in an order in which scenes are played. The selection receiver is configured to receive a selection of one of the pieces of identification information comprised in one of the pieces of list information. The data controller is configured to control playing the video data from a scene identified by the one of identification information received by the selection receiver.

Figure 1:
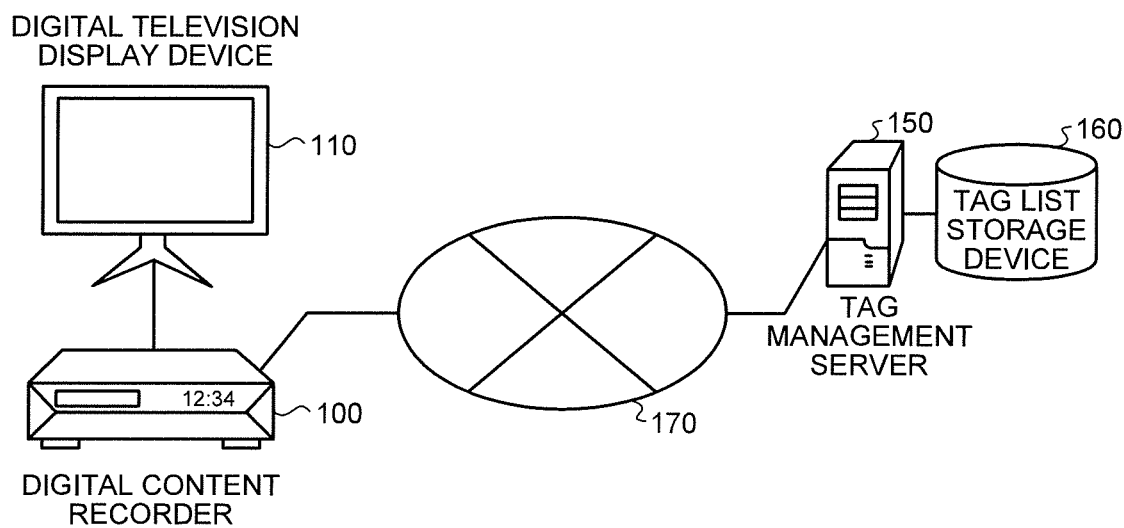
FIG. 1 is an exemplary diagram of a network configuration according to a first embodiment.

FIG. 1 is a schematic diagram of a network configuration according to a first embodiment. As illustrated in FIG. 1, a digital content recorder 100 is connected to a digital television display device 110. The digital content recorder 100 can send data to and receive data from a tag management server 150 connected over a network 170. The first embodiment is an example in which the digital content recorder 100 is used as a video processor.

The tag management server 150 is connected to a tag list storage device 160, and manages tag lists transmitted from other devices (e.g., the content recorder or the television display device). In the first embodiment, an example of tag lists will be explained. However, the list may be any list containing information that identifies a scene in a content, such as a chapter list.

In response to a request by other devices, the tag management server 150 transmits a tag list to the device. For example, if the tag management server 150 receives a request for transmitting a tag list together with the information identifying a content from the digital content recorder 100, the tag management server 150 transmits the tag list for the content to the digital content recorder 100.

In this manner, the digital content recorder 100 can obtain the tag list from the tag management server 150. The digital content recorder 100 then displays the obtained tag list together with the content onto the display screen of the digital television display device 110.

Figure 2:
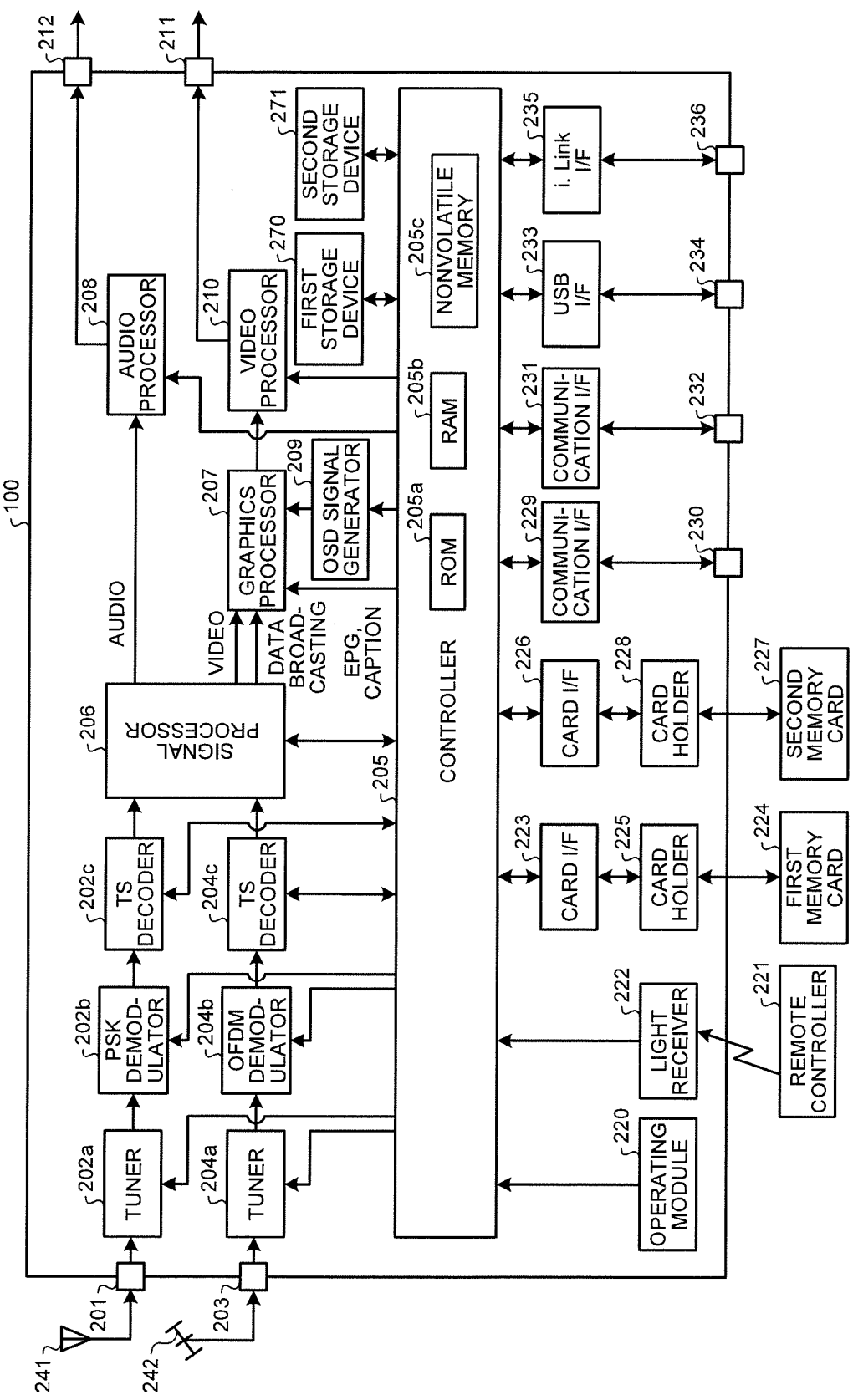
FIG. 2 is an exemplary block diagram of a main signal processing system in a content recorder in the first embodiment.

A hardware configuration of the digital content recorder 100 will now be explained. FIG. 2 is a block diagram of a main signal processing system in the digital content recorder 100 according to the first embodiment.

A satellite digital television broadcast signal received by an antenna 241 for receiving a broadcast satellite (BS)/communication satellite (CS) digital broadcasts is supplied to a tuner 202a that is used for satellite digital broadcasts, via an input terminal 201.

The tuner 202a selects a broadcast signal of a desired channel based on a control signal received from a controller 205, and outputs the broadcast signal thus selected to a phase-shift keying (PSK) demodulator 202b.

The PSK demodulator 202b demodulates the broadcast signal selected by the tuner 202a, based on a control signal received from the controller 205 to obtain a transport stream (TS) containing a desired program, and outputs the transport stream to a TS decoder 202c.

The TS decoder 202c applies a TS decoding on the TS-multiplexed signal based on a control signal received from the controller 205, and outputs a packetized elementary stream (PES) obtained by depacketizing a digital video signal and a digital audio signal of the desired program to a system target decoder (STD) buffer (not illustrated) in a signal processor 206.

The TS decoder 202c also outputs section information transmitted via digital broadcasting to a section processor (not illustrated) in the signal processor 206.

A digital terrestrial television broadcast signal received by an antenna 242 for receiving terrestrial broadcasts is supplied to a tuner 204a that is used for digital terrestrial broadcasts via an input terminal 203.

The tuner 204a selects a broadcast signal of a desired channel based on a control signal received from the controller 205, and outputs the broadcast signal thus selected to an orthogonal frequency division multiplexing (OFDM) demodulator 204b.

The OFDM demodulator 204b demodulates the broadcast signal selected by the tuner 204a, based on a control signal received from the controller 205 to obtain a transport stream containing a desired program, and outputs the transport stream to a TS decoder 204c.

The TS decoder 204c applies a TS decoding on the TS-multiplexed signal based on a control signal received from the controller 205, and outputs a PES obtained by depacketizing a digital video signal and a digital audio signal of the desired program to the STD buffer in the signal processor 206.

The TS decoder 204c also outputs section information transmitted via digital broadcasting to the section processor in the signal processor 206.

When the television is to be viewed, the signal processor 206 selectively applies predetermined digital signal processes to the digital video signal and the digital audio signal supplied from each of the TS decoder 202c and the TS decoder 204c, and outputs the results to a graphics processor 207 and an audio processor 208, respectively. When a program is to be recorded, the signal processor 206 selectively applies predetermined digital signal processes to the digital video signal and the digital audio signal supplied from each of the TS decoder 202c and the TS decoder 204c, and stores the signals applied with the processes in a first storage device (e.g., a hard disk drive (HDD)) 270 for recording programs, via the controller 205. When a recorded program is to be played, the signal processor 206 applies predetermined digital signal processes to recorded program data read from the first storage device (e.g., HDD) 270 via the controller 205, and outputs the results to the graphics processor 207 and the audio processor 208.

The controller 205 receives various types of data required to obtain a program (e.g., key information used in B-CAS descrambling), electronic program guide (EPG) information, program attribute information (e.g., the genre of the program), caption information (service information (SI) or program specific information (PSI)), and the like, from the signal processor 206.

The controller 205 performs an image generating process to display an EPG and a caption from the received information, and outputs image information thus generated to the graphics processor 207.

The controller 205 has a function of controlling recording a program and a function of timer recording a program. When the timer recording of a program is to be scheduled, the controller 205 displays the EPG information onto an external display device (e.g., the digital television display device 110), and sets the schedule for the timer recording to a second storage device 271 in response to a user input made via an operating module 220 or a remote controller 221.

Figure 3:
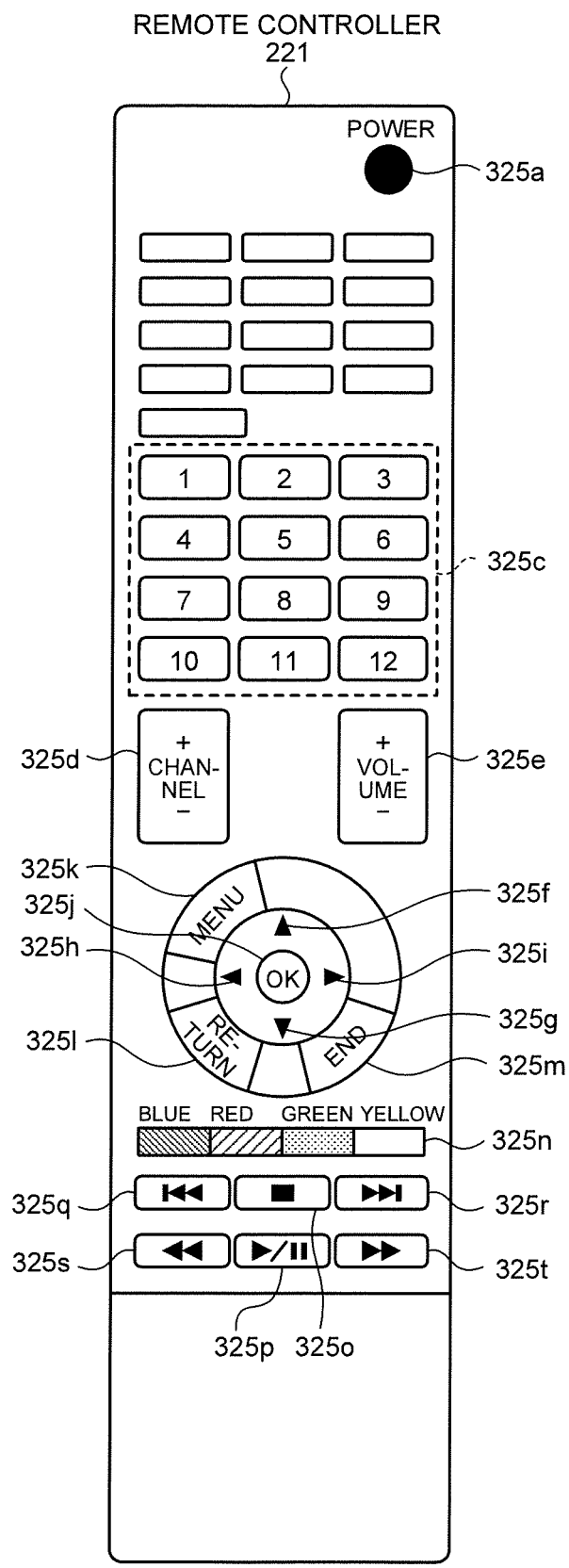
FIG. 3 is an exemplary external plan view of a remote controller in the first embodiment.

FIG. 3 is an external plan view of the remote controller. As illustrated in FIG. 3, the remote controller 221 mainly comprises a power key 325a, numeric keys 325c, a channel up and down key 325d, a volume adjustment key 325e, a cursor up key 325f, a cursor down key 325g, a cursor left key 325h, a cursor right key 325i, an OK key 325j, a menu key 325k, a return key 325l, an end key 325m, and color keys 325n in four colors (blue, red, green, and yellow).

The remote controller 221 also comprises a stop key 325o, a play and pause key 325p, a skip backward key 325q, a skip forward key 325r, a fast rewind key 325s, and a fast forward key 325t.

A user can set a schedule to the second storage device 271 by operating each of the keys arranged on the remote controller 221. The remote controller 221 is also used in making operations to display a tag list to be described later and to select a tag from the tag list.

Referring back to FIG. 2, the controller 205 controls the tuners 202a and 204a, the PSK demodulator 202b, the OFDM demodulator 204b, the TS decoders 202c and 204c, and the signal processor 206 based on the schedule set to the second storage device 271 so that the program is recorded at the scheduled time.

The section processor outputs various types of data required to obtain the program, the EPG information, the program attribute information (e.g., the genre of the program), the caption information (SI or PSI), and the like, to the controller 205 from the section information received from the TS decoder 202c (204c).

The graphics processor 207 has a function of synthesizing (1) a digital video signal supplied from an audio/video (AV) decoder (not illustrated) in the signal processor 206, (2) an on-screen display (OSD) signal generated by an OSD signal generator 209, (3) image data received via data broadcasting, and (4) the EPG and the caption signal generated by the controller 205, and outputs the result to a video processor 210.

The graphics processor 207 also performs, when a caption is to be displayed for a broadcast with a caption, a process of superimposing the caption information over the video signal, based on the caption information generated under the control of the controller 205.

The digital video signal output from the graphics processor 207 is supplied to the video processor 210. The video processor 210 converts the digital video signal thus received into an analog video signal in a format that can be displayed by the digital television display device 110, and outputs the analog video signal to the digital television display device 110 via an output terminal 211 so that the video is displayed.

Further, the audio processor 208 converts the received digital audio signal into an analog audio signal in a format that can be played by the digital television display device, and outputs the analog audio signal to the digital television display device 110 via an output terminal 212 so that the audio is played.

The controller 205 controls all of the operations performed by the digital content recorder 100 in a comprehensive manner, including various receiving operations explained above. The controller 205 has a central processing unit (CPU) and the like internally, and receives operation information input from the operating module 220 or receives operation information sent from the remote controller 221 via a light receiver 222, and controls each of the modules so that the operations are reflected.

At this time, the controller 205 mainly uses a read-only memory (ROM) 205a storing therein control programs executed by the CPU, a random access memory (RAM) 205b providing a working area for the CPU, and a nonvolatile memory 205c storing therein various configuration information, control information, and the like.

The controller 205 is also connected to a cardholder 225 into which a first memory card 224 can be inserted, via a card interface (I/F) 223. In this manner, the controller 205 can transmit information via the first memory card 224 inserted in the card holder 225 and the card I/F 223.

The controller 205 is also connected to a cardholder 228 into which a second memory card 227 can be inserted, via a card I/F 226. In this manner, the controller 205 can transmit information via the second memory card 227 inserted in the card holder 228 and the card I/F 226.

The controller 205 is also connected to a first local area network (LAN) terminal 230 via a communication I/F 229. In this manner, the controller 205 can transmit information to a LAN-compatible device (e.g., an external HDD) that is connected to the first LAN terminal 230 via the communication I/F 229. In such a configuration, the controller 205 has a function of a Dynamic Host Configuration Protocol (DHCP) server, and controls the LAN-compatible device connected to the first LAN terminal 230 by assigning an Internet Protocol (IP) address to such a device.

The controller 205 is also connected to a second LAN terminal 232 via a communication I/F 231. In this manner, the controller 205 can transmit information to various LAN-compatible devices connected to the second LAN terminal 232 via the communication I/F 231.

The controller 205 is also connected to a universal serial bus (USB) connector 234 via a USB I/F 233. In this manner, the controller 205 can transmit information to various devices connected to the USB connector 234 via the USB I/F 233.

The controller 205 is also connected to an i.LINK connector 236 via an i.LINK I/F 235. In this manner, the controller 205 can transmit information to various devices connected to the i.LINK connector 236 via the i.LINK I/F 235.

Explained below is a process performed when a control program related to a tag list, among the control programs stored in the ROM 205a, is executed. FIG. 4 is a diagram illustrating a software configuration realized when the control program is executed by the controller 205.

As illustrated in FIG. 4, the controller 205 comprises an obtaining module 401, a selection receiver 403, and an output controller 404. The controller 205 also comprises a tag list storage module 402 storing therein a tag list in the second storage device 271 illustrated in FIG. 2.

The output controller 404 comprises a list selection screen output controller 411, a tag list output controller 412, and a content output controller 413, and controls outputting various types of data so as to make a display on the digital television display device 110.

The output controller 404 also controls outputting of a content selection screen for allowing a user to select a content to be displayed to the digital television display device 110.

FIG. 5 is a diagram illustrating an example of the content selection screen. In the example of a content selection screen 500 illustrated in FIG. 5, a list of contents stored in the first storage device 270 for recording is displayed. For each of the contents, the content list displays a thumbnail image presenting one scene of the content.

A user can then select a content by operating a key on the remote controller 221. Every time a key is operated, the remote controller 221 outputs information about the operation made on the key to the digital content recorder 100. The digital content recorder 100 then controls to output a content selection screen with a change applied by the operation to the digital television display device 110 based on the operation information.

For example, when the output controller 404 receives a pressing operation of the OK key 325j on the remote controller 221 while the output is controlled under the state that the content 501 has been selected, the content output controller 413 controls outputs to play the content thus selected based on the operation information received from the remote controller 221.

If the remote controller 221 receives a pressing operation of a color key assigned to "display tag list" among the color keys 325n in four colors (blue, red, green, and yellow) while the content 501 is selected on the content selection screen, the digital content recorder 100 performs control for displaying a tag list.

The obtaining module 401 requests the tag management server 150 to transmit a tag list related to the selected content (e.g., the content 501) via the communication I/F 229. At this time, the obtaining module 401 transmits information for identifying the content. The information for identifying a content may be a combination of a program name, broadcast date and time, broadcast start time, a broadcast station, and a channel code, for example.

The obtaining module 401 obtains a plurality of tag lists related to the content and transmitted in response to the transmission request. The first embodiment is not limited to an example in which the tag list is obtained via a network. As another example, a tag list stored in the second storage device 271 may be obtained.

A tag list will now be explained. FIGS. 6 to 8 are diagrams illustrating examples of a tag list created by a user. The tag lists illustrated in FIGS. 6 to 8 are tag lists that are created by different users for the same content. Each tag included in a tag list is associated with a tag position (time elapsed H:MM:SS from the beginning of the content) that identifies a scene of the content, and text information for identifying the tag.

As illustrated in FIGS. 6 to 8, although the content is the same, the tag positions where the tags are set and the text information for the tags are different among the users.

The example illustrated in FIG. 6 is a tag list that is a collection of scenes related a team B that is of interest of a user 1. For example, FIG. 6 illustrates that the content has a scene indicated by "team B yellow card" at the time of "0:15:10".

The example illustrated in FIG. 7 is a tag list that is a collection of scenes related to a team A that is of interest of a user 2. The example illustrated in FIG. 8 is a tag list that is a collection of scenes related a player X that is of interest of a user 3.

The tag lists managed by the tag management server 150 (e.g., the tag lists illustrated in FIGS. 6 to 8) are transmitted in response to a request issued by other devices.

FIG. 9 is a diagram illustrating an example of a format of a tag list transmitted from the tag management server 150 to another device (e.g., the digital content recorder 100). In the example illustrated in FIG. 9, the tag list illustrated in FIG. 6 is transmitted. The example illustrated in FIG. 9 is in the Extensible Markup Language (XML) format. However, the format may be any other format.

The example of the tag list illustrated in FIG. 9 comprises a program name 901, broadcast date and time 902, broadcast start time 903, a broadcast station 904, and a channel code 905. In this manner, the content associated with the tag list can be identified. The tag list also includes a tag list title 911 created by the user. Each tag (e.g., a "tagging-01" tag 912) includes time elapsed (e.g., a "timestamp" tag 913), and text information (e.g., a "text" tag 914).

In this manner, each of the tag lists contains information for identifying the content. Therefore, when the digital content recorder 100 transmits information for identifying a content with a request for transmitting a tag list to the tag management server 150, for example, the tag management server 150 can transmit the tag list associated with the information for identifying the content to the digital content recorder 100.

The obtaining module 401 comprised in the digital content recorder 100 then obtains the tag list transmitted by the tag management server 150, and stores the tag list in the tag list storage module 402 comprised in the second storage device 271.

In this manner, the list selection screen output controller 411 comprised in the output controller 404 displays a tag list selection screen in which a plurality of tag lists stored in the tag list storage module 402 are arranged.

Figure 10:
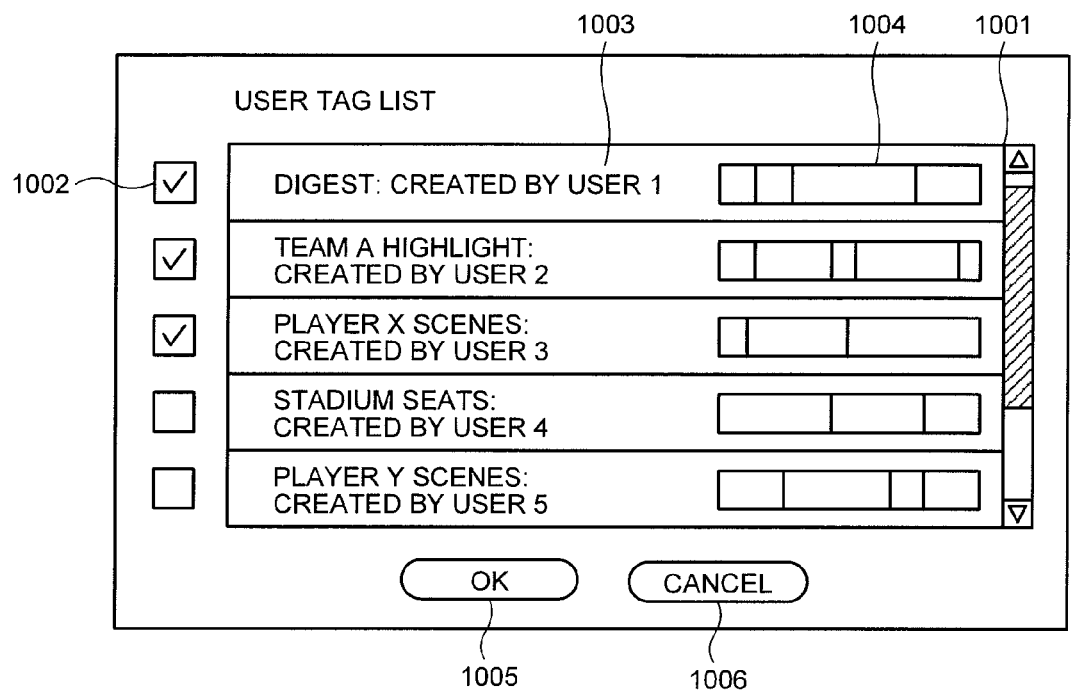
FIG. 10 is an exemplary diagram of a tag list selection screen output from a list selection screen output controller in the first embodiment.

FIG. 10 is a diagram illustrating an example of a tag list selection screen output from the list selection screen output controller 411. As illustrated in FIG. 10, in the tag list selection screen, a menu of tag lists associated with the content selected on the content selection screen is displayed in a section 1001. The tag list selection screen displays a title 1003 given to the tag list and a content play bar 1004 indicating the tag positions for each of the tag list. A user then checks the checkbox of the tag list the user wishes to display (e.g., a checkbox 1002). Selection of a checkbox is performed by an operation via the remote controller 221.

The selection receiver 403 receives a selection of a tag list among the tag lists arranged in the tag list selection screen based on an operation made via the remote controller 221. The selection receiver 403 according to the first embodiment can receive a selection of a tag list in the number equal to or less than the number of the tag lists arranged in the tag list selection screen.

The list selection screen output controller 411 also displays an OK button 1005 and a cancel button 1006 in the tag list selection screen. If a selection of the OK button 1005 made via an operation on the remote controller 221 is received, the tag list selected in the tag list selection screen as well as the content selected in the content selection screen are displayed.

The tag list output controller 412 controls the digital television display device 110 so as to output display screen information in which a plurality of tag lists are arranged on the display screen in which the content is being displayed.

Figure 11:
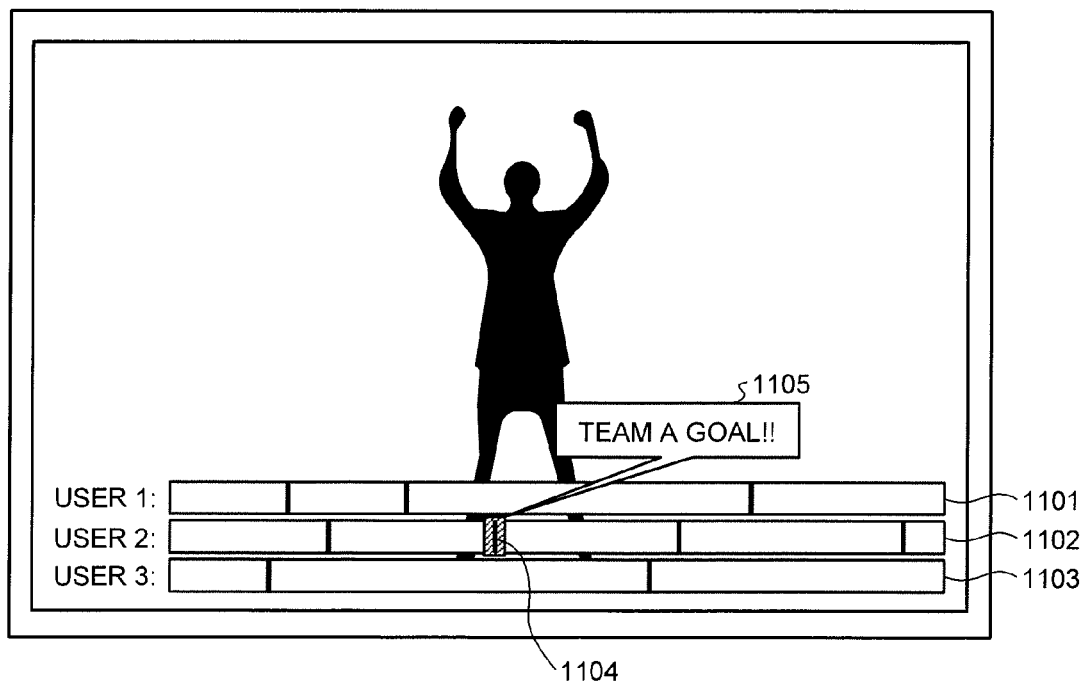
FIG. 11 is an exemplary diagram of a display screen displaying a content arranged by a tag list output controller in the first embodiment.

FIG. 11 is a diagram illustrating an example of a display screen displaying a content having a plurality of tag lists arranged by the tag list output controller 412. In the example of the display screen illustrated in FIG. 11, a plurality of tag lists associated with the content being played are displayed simultaneously. In this manner, a user can check the tag lists and the content simultaneously.

In the display screen illustrated in FIG. 11, tag lists 1101, 1102, and 1103 are arranged. In the tag lists 1101, 1102, and 1103, a plurality of tags are arranged along the play bar in the order in which the scenes associated with the tags are played.

The user then selects a tag included in the tag lists that are simultaneously displayed using the remote controller 221. When the selection receiver 403 recognizes that the cursor up key 325f or the cursor down key 325g is pressed down on the remote controller 221, the selection receiver 403 determines that an operation of selecting another tag list is received. When the selection receiver 403 recognizes that cursor left key 325h or the cursor right key 325i is pressed down, the selection receiver 403 determines that an operation of selecting a tag included in the selected tag list is received. The tag list output controller 412 then controls to output display screen information based on the selecting operation. In this manner, the selection receiver 403 switches a tag and a tag list currently being selected based on a pressing operation of direction keys arranged on the remote controller 221.

For example, when a tag is selected, the tag list output controller 412 controls to output text information related to the tag. The display screen illustrated in FIG. 11 is an example where a tag 1104 is selected on the tag list 1102. Along this operation, the tag list output controller 412 controls to output a popup window 1105 corresponding to the tag 1104. Text information associated with the tag 1104 is placed in the popup window 1105. In this manner, the user can recognize the content of the tag.

The selection receiver 403 then receives a selection of a tag included in the tag list being displayed. The selection receiver 403 receives a selection based on an pressing operation of the OK key 325j performed on the remote controller 221 while the tag is being selected.

When the selection receiver 403 receives a selection of a tag, the content output controller 413 controls outputs to the digital television display device 110 so that the content began to play from the scene (replay position) indicated by the tag position.

The tag list output controller 412 is not limited to control displaying a plurality of tag lists automatically when the content began to play. For example, the tag list output controller 412 may switch show/hide status of tag lists based on a selecting operation performed by a user and received by the selection receiver 403.

Figure 12:
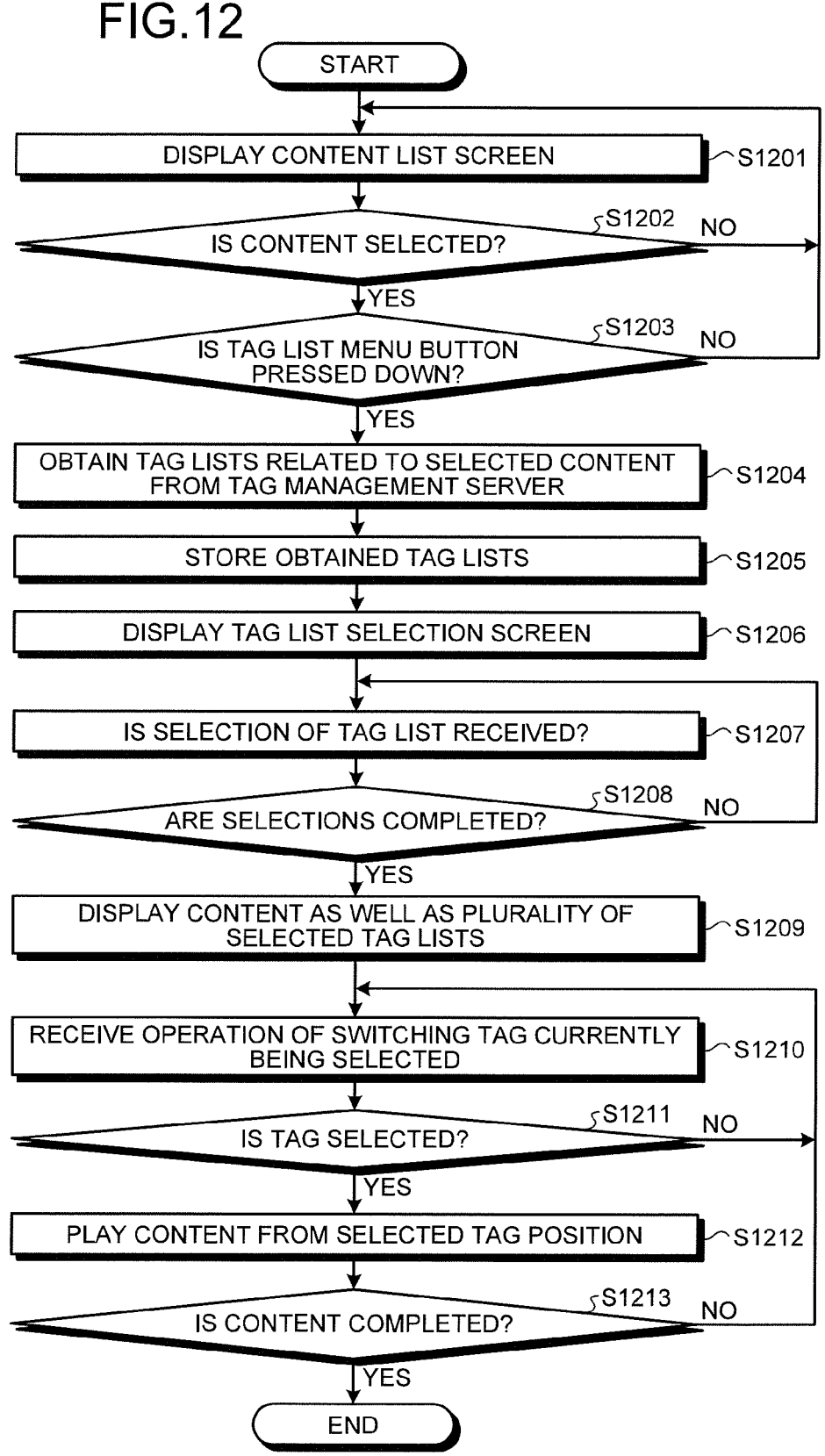
FIG. 12 is an exemplary flowchart of an entire process performed by the content recorder in the first embodiment.

The entire process performed by the digital content recorder 100 according to the first embodiment will now be explained. FIG. 12 is a flowchart illustrating the process performed by the digital content recorder 100 according to the first embodiment.

To begin with, the output controller 404 controls outputs so as to display the content list screen (S1201). In this manner, the content list screen such as the example illustrated in FIG. 5 is displayed.

The selection receiver 403 then determines if a selection of a content has been received in the content list screen (S1202). If no selection is received (No at S1202), the output controller 404 continues to control outputting the content list screen (S1201).

On the contrary, if the selection receiver 403 determines that a selection of a content has been received (Yes at S1202), the selection receiver 403 further determines if any pressing operation of a button for displaying a tag list menu (e.g., the color key 325n) has been received (S1203). If it is determined that any pressing operation of the button for displaying the tag list menu has not been received (No at S1203), the output controller 404 continues to control outputting the content list screen (S1201). On the contrary, if the selection receiver 403 receives a pressing operation of the button for displaying the tag list menu (Yes at S1203), the obtaining module 401 obtains the tag lists related to the content selected at S1202 from the tag management server 150 (S1204). If the OK key 325j is pressed down instead of the button for displaying the tag list menu, the content thus selected is played.

The obtaining module 401 then stores the tag lists thus obtained in the tag list storage module 402 (S1205). The list selection screen output controller 411 then reads the tag lists stored in the tag list storage module 402, and controls to output the tag list selection screen in which the tag lists are displayed as a menu (S1206).

The selection receiver 403 then receives selections of a plurality of tag lists from the list of the tag lists being displayed in the tag list selection screen (S1207).

The selection receiver 403 then determines if selections of the tag lists have been completed (S1208). In the first embodiment, it is determined based on whether the OK button 1005 is pressed in the tag list selection screen illustrated in FIG. 10. If it is determined that selections are not completed (No at S1208), the selection receiver 403 continues receiving a selection of a tag list (S1207).

On the contrary, if the selection receiver 403 determines that the selections have been completed (Yes at S1208), the tag list output controller 412 controls outputs so that the tag lists thus selected are displayed along with the content being played (S1209). In this manner, as illustrated in FIG. 11, a plurality of tag lists are displayed with the content.

The selection receiver 403 then receives an operation of switching a tag list and a tag currently being selected based on operation information received from the remote controller 221 (S1210).

The selection receiver 403 then determines if a confirmation of a tag selection is received (S1211). If any confirmation of a selection is not received (No at S1211), the selection receiver 403 receives a switching operation again from S1210.

On the contrary, if the selection receiver 403 receives the confirmation of a tag selection (Yes at S1211), the content output controller 413 controls outputs so that the content is played from the tag position thus selected (S1212).

The content output controller 413 then determines if the content being played is ended (S1213). If the content output controller 413 determines that the content has not ended yet (No at S1213), the selection receiver 403 receives a switching operation again from S1210.

On the contrary, the content output controller 413 determines that the content being replayed has ended (Yes at S1213), the process is ended.

When a selection of a tag that the user desires is received from a plurality of tag lists being displayed, it becomes capable by the aforementioned process to playing the content from the position indicated by the tag.

In the digital content recorder 100 according to the first embodiment, obtained tag lists are stored in the tag list storage module 402. In this manner, the tag lists can be displayed when the content is to be played next time. When the content is to be played next time, a plurality of tag lists previously selected may be displayed, or a tag list selection screen may be displayed so that a selection of a tag list can be received.

Explained in the digital content recorder 100 according to the first embodiment is an example in which three tag lists are displayed at the bottom area of the display screen. However, the display mode is not limited to such a displaying scheme. For example, five tag lists may be displayed vertically in a predetermined area along the right side of the display screen. In addition, when the selection receiver 403 receives selections of three or more tag lists, the tag list output controller 412 may arrange only three of such tag lists at the bottom area of the display screen, and may display the remaining tag lists in a scroll list that is operated based on selection information (e.g., a pressing operation of an up or a down key) received by the selection receiver 403 so as to enable such tag lists to be selected.

Explained in the first embodiment is an example in which a broadcasted program content or a program content distributed over a network is processed. However, the content is not limited to a program content, as long as such a content is a video content that a user can set a tag and the like to a given scene included in such a content. Furthermore, the content is not limited to a video content, and may be a music content, for example.

Because the content recorder according to the first embodiment has the structure explained above, the user can easily check a set of tag lists that can be obtained from a server in association with the content for which the tag lists are created. Furthermore, the user can easily select a desired tag from substantial amount of tags, and easily view the content from the position indicated by the tag.

Explained in the first embodiment is an example in which a video processor is used as a content recorder. However, embodiments are also applicable to a device other than a content recorder. Therefore, in a second embodiment, an example of an embodiment being applied to a television display device will be explained.

Figure 13:
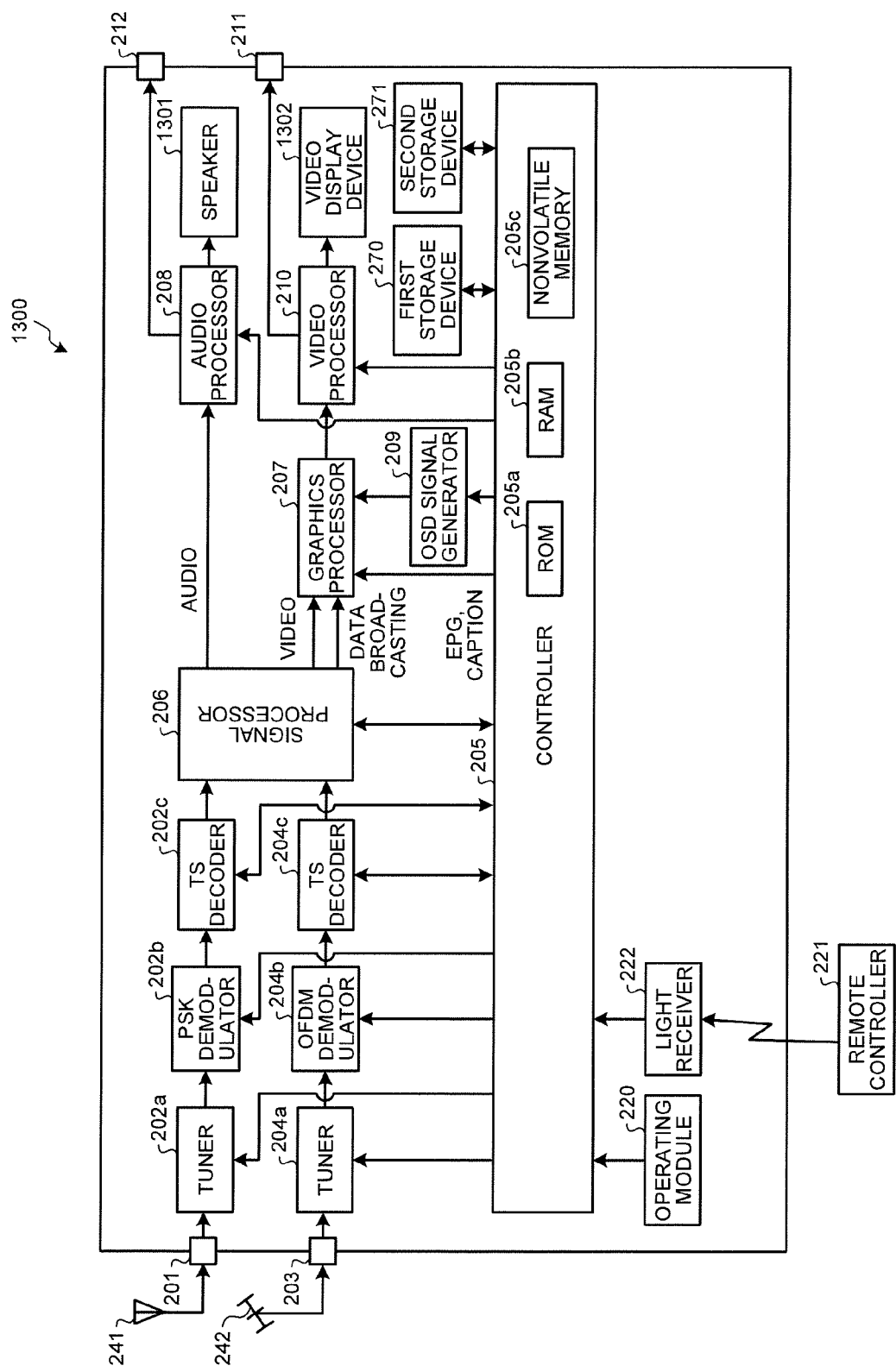
FIG. 13 is an exemplary block diagram of a main signal processing system of a television display device according to a second embodiment.

A hardware configuration of the television display device will now be explained. FIG. 13 is a block diagram illustrating a main signal processing system of a digital television display device 1300 according to the second embodiment.

In the main signal processing system of the digital television display device 1300 illustrated in FIG. 13, a speaker 1301 and a video display device 1302 that are installed internally in the digital television display device 1300 are added to the digital content recorder 100 illustrated in FIG. 2.

The speaker 1301 receives an analog audio signal in a format that can be replayed by the audio processor 208 from the audio processor 208, and outputs the analog audio signal to an external environment.

The video display device 1302 is a liquid crystal display, for example, and displays a screen based on an analog video signal received from the video processor 210.

The digital television display device 1300 reads a control program stored in the ROM 205a and executes various processes in the same manner as the digital content recorder 100 according to the first embodiment. The digital television display device 1300 according to the second embodiment realizes the same software configuration as that of the digital content recorder 100 according to the first embodiment (e.g., see FIG. 4).

The digital television display device 1300 according to the second embodiment can obtain a plurality of tag lists by transmitting and receiving data to and from the tag management server 150 connected over a network, and display screens illustrated in FIGS. 5, 10, and 11, in the same manner as in the first embodiment.

In the first and the second embodiments described above, a user can easily select a desired tag from a set of tags displayed on a plurality of tag lists using the remote controller 221.

Embodiments are also applicable to equipment other than the content recorder and the television display device. In a third embodiment, an example using a mobile terminal device will be explained.

FIG. 14 is a schematic illustrating a mobile terminal device 1400 according to the third embodiment and the digital television display device 110.

It is assumed herein that the terminal device 1400 illustrated in FIG. 14 has the same hardware configuration as an ordinary personal computer (PC) and the like, and an explanation thereof is omitted herein. The terminal device 1400 may be interconnected with the digital television display device 110 via the Digital Living Network Alliance (DLNA) protocols.

The terminal device 1400 functions as a digital media controller (DMC), and enables the digital television display device 110 to be operated.

The terminal device 1400 comprises a liquid crystal panel 1401, and can display various types of data onto the liquid crystal panel 1401.

The terminal device 1400 can transmit and receive data to and from the tag management server 150, and display a plurality of tag lists onto the liquid crystal panel 1401. The terminal device 1400 receives a pressing operation on a tag position from the tag lists being displayed, and instructs the digital television display device 110 to play the content from the tag position.

In this manner, the terminal device 1400 according to the third embodiment can realize the same functions as those achieved by the digital content recorder 100 according to the first embodiment.

In the content recorder, the television display device, and the terminal device according to the embodiments, a plurality of different tag lists are displayed. Therefore, the content can be checked from different perspectives. Furthermore, the user can easily play the content from a tag included in tag lists edited from these perspectives. Therefore, convenience in viewing the content can be improved.

The processing program executed on the content recorder, the television display device, and the terminal device according to the embodiments may be provided in a manner recorded in a computer-readable recording medium such as a compact disk read-only memory (CD-ROM), a flexible disk (FD), a compact disk recordable (CD-R), or a digital versatile disk (DVD) as a file in an installable or an executable format.

The processing program executed on the content recorder, the television display device, and the terminal device according to the embodiments may be stored in a computer connected to a network such as the Internet, and be provided by making the program available for download over the network. The processing program executed on the content recorder, the television display device, and the terminal device according to the embodiments may be provided or distributed over a network such as the Internet.

The processing program executed on the content recorder, the television display device, and the terminal device according to the embodiments has a modular structure including each of the modules (the obtaining module, the selection receiver, and the output controlling module). As actual hardware, the CPU is caused to read the processing program from the ROM and execute the processing program to load each of the modules on the RAM, and to generate the obtaining module, the selection receiver, and the output controlling module on the RAM.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video processor comprising:
an obtaining module configured to obtain a plurality of pieces of list information for video data, wherein
the pieces of list information are generated by different users, respectively,
a plurality of pieces of identification information identifying scenes contained in the video data are arranged in each of the pieces of list information in an order in which the scenes are played, and
the pieces of identification information are set to different scenes for different users;
a list display module configured to display, on a display module, display information on which the plurality of pieces of list information obtained by the obtaining module are arranged;
a selection receiver configured to receive a selection of one of the pieces of identification information comprised in the pieces of list information displayed by the list display module; and
a data controller configured to control playing of the video data from one of the scenes identified by the one of the pieces of identification information received by the selection receiver.

2. The video processor of claim 1, further comprising:
a selection screen output module configured to output a list selection screen in which the pieces of list information obtained by the obtaining module are arranged, wherein
the selection receiver is configured to receive selections of at least some of the pieces of list information arranged in the list selection screen, a number of the at least some of the pieces of list information being less than or equal to a number of the pieces of list information arranged in the list selection screen, and
the list display module is configured to display, on the display module, display information on which the at least some of the pieces of list information selected by the selection receiver are arranged.

3. The video processor of claim 1, wherein the obtaining module is configured to obtain the pieces of list information from a management device which manages the list information via a network.

4. The video processor of claim 1, wherein the selection receiver is configured to switch between the pieces of identification information in accordance with a pressing operation of a key for operating directions and arranged on an input device.

5. The video processor of claim 1, wherein the screen information output by the list display module and on which the pieces of list information are arranged comprises the video data controlled by the data controller to be played.

6. A television display device comprising:
an obtaining module configured to obtain a plurality of pieces of list information for video data, wherein
the pieces of list information are generated by different users, respectively,
a plurality of pieces of identification information identifying scenes contained in the video data are arranged in each of the pieces of list information in an order in which the scenes are played, and
the pieces of identification information are set to different scenes for different users;

a list display module configured to display, on a display module, display information on which the plurality of pieces of list information obtained by the obtaining module are arranged;

a selection receiver configured to receive a selection of one of the pieces of identification information comprised in the pieces of list information displayed by the list display module; and a data controller configured to control playing of the video data from a scene identified by the one of the pieces of identification information received by the selection receiver.

7. A video processing method comprising:

obtaining a plurality of pieces of list information for video data, wherein the pieces of list information are generated by different users, respectively, a plurality of pieces of identification information identifying scenes contained in the video data are arranged in each of the pieces of list information in an order in which the scenes are played, and the pieces of identification information are set to different scenes for different users;

displaying, on a display module, display information on which the plurality of pieces of list information obtained by the obtaining are arranged;

receiving a selection of one of the pieces of identification information comprised in the pieces of list information displayed by the displaying; and controlling playing of the video data from one of the scenes identified by the one of the pieces of identification information received by the receiving.

8. The video processing method of claim 7, further comprising:

outputting a list selection screen in which the pieces of list information obtained by the obtaining are arranged, wherein the receiving comprises receiving selections of at least some of the pieces of list information arranged in the list selection screen, a number of the at least some of the pieces of list information being less than or equal to a number of the pieces of list information arranged in the list selection screen, and the outputting comprises displaying, on the display module, display information on which the at least some of the pieces of list information selected by the selection receiver are arranged.

* * * * *